(12) United States Patent
Bergerhoff et al.

(10) Patent No.: US 7,857,180 B2
(45) Date of Patent: Dec. 28, 2010

(54) LOAD CARRIER FOR MOTOR VEHICLES

(75) Inventors: Harald Bergerhoff, Hamburg (DE); Michael Waller, Hamburg (DE); Gerald Hahn, Wistedt (DE)

(73) Assignee: Magna Car Top Systems GmbH, Bietigheim-Bissingen (DE)

( * ) Notice: Subject to any disclaimer, the term of this patent is extended or adjusted under 35 U.S.C. 154(b) by 846 days.

(21) Appl. No.: 11/773,068

(22) Filed: Jul. 3, 2007

(65) Prior Publication Data

US 2008/0006665 A1    Jan. 10, 2008

(30) Foreign Application Priority Data

Jul. 8, 2006    (DE) .................. 10 2006 031 692

(51) Int. Cl.
  *B60R 9/10* (2006.01)
  *B60Q 1/00* (2006.01)
  *B60Q 5/00* (2006.01)

(52) U.S. Cl. .................. 224/510; 224/281; 224/495; 224/924; 340/438

(58) Field of Classification Search .............. 224/282, 224/496, 497, 508, 924, 489, 491, 281, 495, 224/510; 296/26.09; 340/904, 438, 426.34
See application file for complete search history.

(56) References Cited

U.S. PATENT DOCUMENTS

| | | | | |
|---|---|---|---|---|
| 3,789,357 | A * | 1/1974 | Fritz, Jr. ........................ | 180/286 |
| 5,602,526 | A * | 2/1997 | Read .......................... | 340/457 |
| 6,137,419 | A * | 10/2000 | Lennox et al. .............. | 340/687 |
| 6,701,913 | B1 * | 3/2004 | LeDuc et al. ............... | 126/276 |
| 6,712,171 | B2 * | 3/2004 | Farmer ........................ | 180/286 |
| 6,727,806 | B1 * | 4/2004 | Massie et al. .......... | 340/426.24 |
| 7,081,812 | B2 * | 7/2006 | Hastings, Sr. .............. | 340/456 |
| 7,389,898 | B2 * | 6/2008 | Riemer et al. .............. | 224/509 |
| 2003/0201876 | A1 * | 10/2003 | Stegman et al. ............. | 340/433 |

FOREIGN PATENT DOCUMENTS

| | | | |
|---|---|---|---|
| DE | 44 41 853 | A1 | 5/1996 |
| DE | 196 23 398 | A1 | 12/1997 |
| DE | 102 31 963 | A1 | 2/2004 |
| DE | 203 16 591 | U1 | 3/2004 |
| DE | 10257903 | A1 * | 6/2004 |
| DE | 103 48 679 | A1 | 6/2005 |
| DE | 20 2005 012 475 | U1 | 10/2005 |
| DE | 10 2004 031 224 | A1 | 1/2006 |

* cited by examiner

*Primary Examiner*—Justin M Larson
(74) *Attorney, Agent, or Firm*—Brooks Kushman P.C.

(57) ABSTRACT

A bicycle carrier includes a base holder mountable to a vehicle and a support holder for holding a bicycle. The holders both include front and rear frames which extend transversely to a longitudinal vehicle direction. The support holder is movable in the longitudinal direction between a neutral position in which the holders extend over one another and an operating position in which the holders extend out from one another. The front frames meet when the support holder is in the neutral position and the rear frames meet when the support holder is in the operating position. A switch has a pair of switching components respectively located on one of the pair of front frames or the pair of rear frames. The switching components contact one another to activate the switch when the pair of frames meet and the switch actuates an indicator device upon being activated.

16 Claims, 2 Drawing Sheets

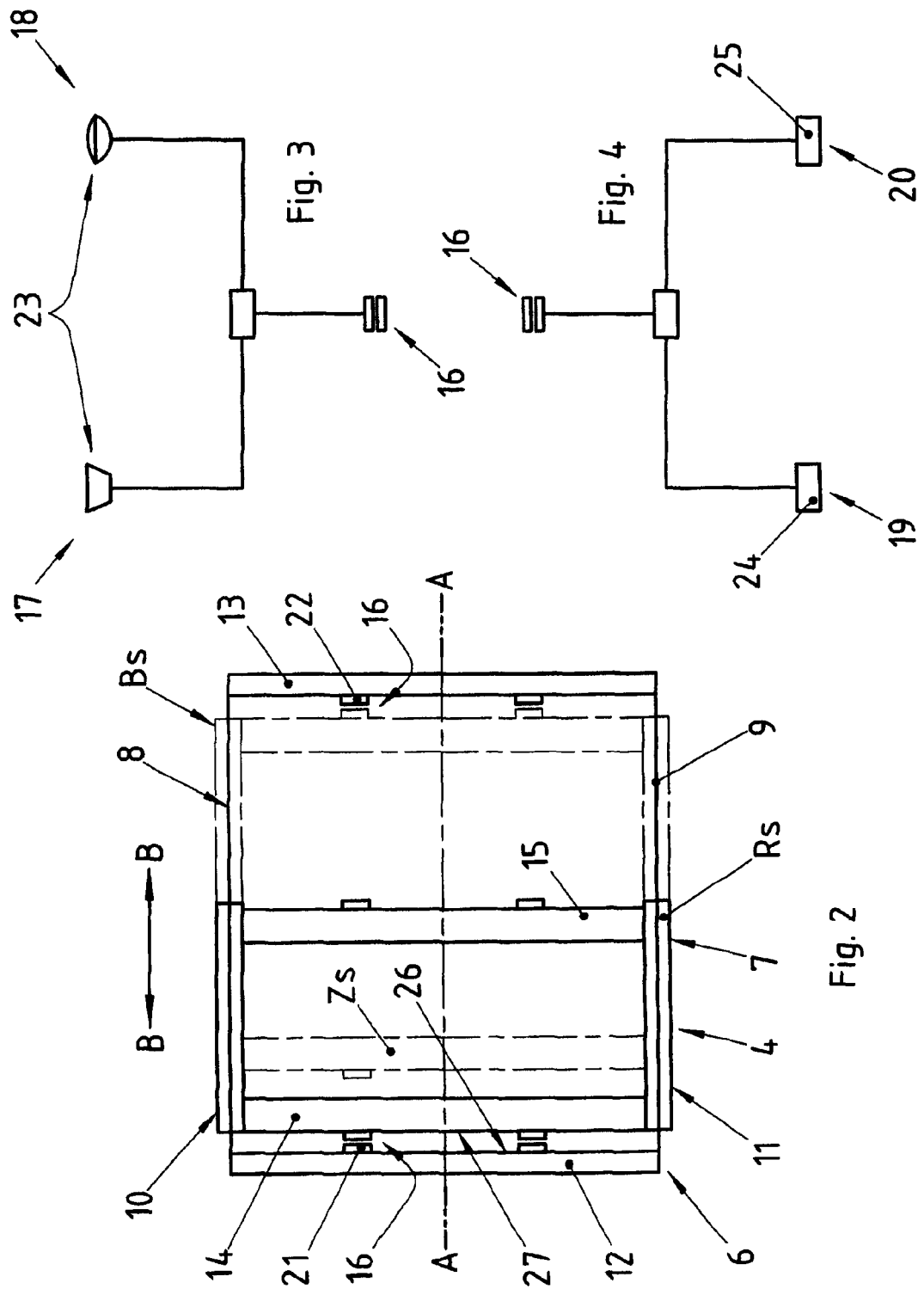

LOAD CARRIER FOR MOTOR VEHICLES

CROSS-REFERENCE TO RELATED APPLICATIONS

This application claims foreign priority benefits under 35 U.S.C. §119(a)-(d) to DE 10 2006 031 692.4, filed Jul. 8, 2006, which is hereby incorporated by reference in its entirety.

BACKGROUND OF THE INVENTION

1. Field of the Invention

The present invention relates to a bicycle carrier for a vehicle.

2. Background Art

DE 102 31 963 B4 describes a load carrier having a load support displaceably supported to a vehicle by a track system. A fixing device fixes the load support in either a retracted neutral position or an extended operating position relative to the vehicle.

DE 44 41 853 A1 describes a vehicle having a rear bumper movable between an extended position and a neutral position by connecting profile rods. The bumper and profile rods serve as a support device for a transported article such as a bicycle.

DE 203 16 591 U1 describes a vehicle having a telescopically extendable bumper for holding bicycles. The bumper has cantilever beams by which the bumper may be movable between end, neutral, and operating positions. A spreading device is between a vehicle frame extending transverse to the longitudinal direction of the vehicle. The spreading device is elastically pre-tensioned in the direction of extension of the bumper. The spreading device automatically extends into the end position after a locking device is released.

SUMMARY OF THE INVENTION

An object of the present invention includes a bicycle carrier for a vehicle in which the bicycle carrier is movable between a neutral position and an operating position and an electrically powered device is actuated when the bicycle carrier is in at least one of the neutral and operating positions.

In carrying out the above objects and other objects, an embodiment of the present invention provides a bicycle carrier for a vehicle. The bicycle carrier includes a base holder mountable to a vehicle and a support holder for holding a bicycle. The base holder includes front and rear frame elements which are spaced apart from one another and extend transversely to a longitudinal vehicle direction. The support holder includes front and rear frame elements which are spaced apart from one another and extend transversely to the longitudinal vehicle direction. The support holder is movable relative to the base holder in the longitudinal vehicle direction between a neutral position and an operating position. The front frame elements meet when the support holder is in the neutral position. The rear frame elements meet when the support holder is in the operating position. A switch has a pair of switching components respectively located on one of the pair of front frame elements or the pair of rear frame elements. The switching components contact one another to activate the switch when the pair of frame elements meet. The switch actuates an indicator device upon being activated.

Further, in carrying out the above objects and other objects, an embodiment of the present invention provides a bicycle carrier for a vehicle. The bicycle carrier includes a base holder mountable to a vehicle and a support holder for holding a bicycle. The base holder includes front and rear frame elements which are spaced apart from one another and extend transversely to a longitudinal vehicle direction. The support holder includes front and rear frame elements which are spaced apart from one another and extend transversely to the longitudinal vehicle direction. The support holder is movable relative to the base holder in the longitudinal vehicle direction between a neutral position and an operating position. The front frame elements meet when the support holder is in the neutral position. The rear frame elements meet when the support holder is in the operating position.

The bicycle carrier further includes first and second switches. The first switch has a pair of switching components respectively located on the front frame elements. The switching components contact one another to activate the first switch when the front frame elements meet while the support holder is in the neutral position. The second switch has a pair of switching components respectively located on the rear frame elements. The switching components contact one another to activate the second switch when the rear frame elements meet while the support holder is in the operating position.

The bicycle carrier further includes first and second indicator devices. The first indicator device is supported on at least one of the base holder and the support holder. The first indicator device is connected to the first switch and actuable to generate an indicator indicating that the support holder is in the neutral position. The first switch actuates the first indicator device upon being activated while the support holder is in the neutral position. The second indicator device is supported on at least one of the base holder and the support holder. The second indicator device is connected to the second switch and actuable to generate an indicator indicating that the support holder is in the operating position. The second switch actuates the second indicator device upon being activated while the support holder is in the operating position.

Principal advantages achieved by a bicycle carrier for a vehicle in accordance with embodiments of the present invention are that electrical switching devices detect the neutral position and/or the operating position and/or other positions of the support holder. In response to detecting certain positions of the support holder, the switching devices actuate electrically powered devices in the vehicle. A warning device may be used as an electrically powered device. A switching device actuates the warning device to generate acoustic or visual signals informing an operator of the vehicle of positions of the support holder which are correct or in need of correction. The electrically powered devices may include tail lights for the bicycle carrier. In this case, the switching devices may switch off the tail lights when the support holder is in the retracted neutral position. The switching device may have mechanically actuated switches such as Reed contact relays. Reed contact relays are suited for sophisticated end position recognition and have installation ease and high reliability when properly functioning.

The above features, and other features and advantages of the present invention are readily apparent from the following detailed descriptions thereof when taken in connection with the accompanying drawings.

BRIEF DESCRIPTION OF THE DRAWINGS

FIG. 2 illustrates a top schematic view of the bicycle carrier;

FIG. 3 illustrates a block diagram of electrically powered devices which are controllable by a switching device of the bicycle carrier; and FIG. 4 illustrates a second block diagram of electrically powered devices which are controllable by a switching device of the bicycle carrier.

DETAILED DESCRIPTION OF THE PREFERRED EMBODIMENT(S)

Figure 1:
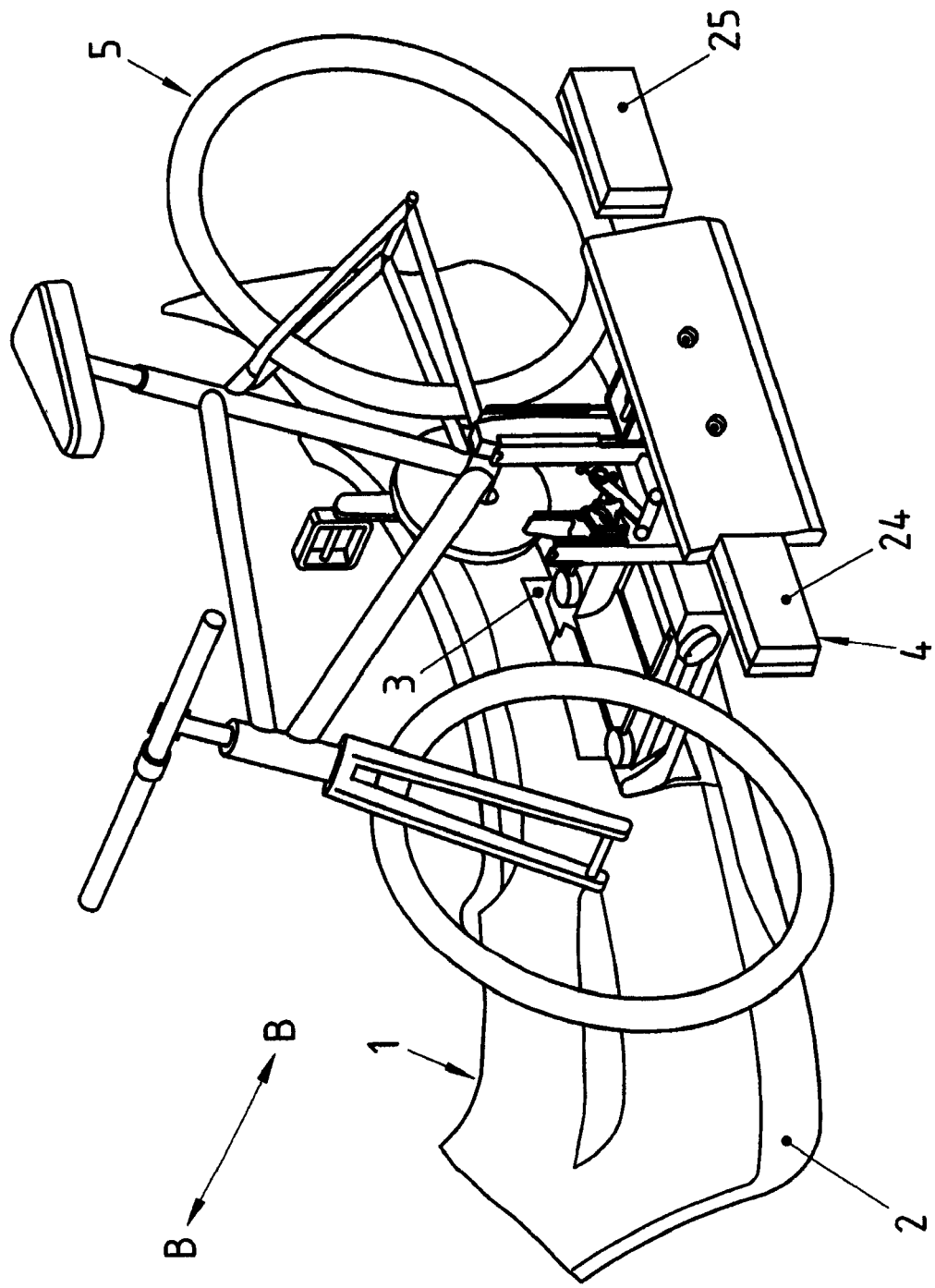
FIG. 1 illustrates a perspective view of a rear end portion of a vehicle having a bicycle carrier in accordance with an embodiment of the present invention.

Identical components have the same reference numerals in the figures.

Referring now to FIG. 1, a perspective view of a rear end portion 2 of a vehicle 1 having a bicycle carrier 4 in accordance with an embodiment of the present invention is shown. Rear end vehicle portion 2 has an opening 3 running along a central longitudinal plane A-A of vehicle 1 (see FIG. 2) for receiving an extension of carrier 4 in order for carrier 4 to be mounted to vehicle 1. Carrier 4 is intended for use with vehicle 1 to transport two upright bicycles side-by-side.

Referring now to FIG. 2, with continual reference to FIG. 1, a schematic top view of carrier 4 is shown. Carrier 4 includes a base holder 6 and a support holder 7. A pair of bicycles aligned transversely to longitudinal direction B-B of vehicle 1 may mount onto support holder 7. FIG. 1 illustrates a bicycle 5 mounted onto support holder 7 in this manner. Support holder 7 is movable relative to base holder 6 along longitudinal vehicle direction B-B between a neutral position Rs and an operating position Bs. Support holder 7 may hold bicycle 5 during operation of vehicle 1 while support holder 7 is in operating position Bs as support holder 7 is extended out from vehicle 1. FIG. 1 illustrates support holder 7 holding bicycle 5 while in its operating position Bs.

In order to enable support holder 7 to be movable relative to base holder 6, base holder 6 includes inner guide rails 8, 9 and support holder 7 includes corresponding outer guide rails 10, 11. Inner guide rails 8, 9 are transversely spaced apart from one another on respective sides of base holder 6 and run along longitudinal vehicle direction B-B. As such, inner guide rails 8, 9 are on respective sides of central longitudinal plane A-A. Likewise, outer guide rails 10, 11 are transversely spaced apart from one another on respective sides of support holder 7 and run along longitudinal vehicle direction B-B. As such, outer guide rails 10, 11 are on respective sides of central longitudinal plane A-A.

Inner guide rails 8, 9 cooperate with outer guide rails 10, 11 to enable support holder 7 to move relative to base holder 6 along longitudinal vehicle direction B-B between neutral position Rs and operating position Bs. Inner guide rails 8, 9 are connected at one end to a front frame element 12 of base holder 6. Inner guide rails 8, 9 are connected at their other end to a rear frame element 13 of base holder 6. Frame elements 12, 13 run transverse to longitudinal vehicle direction B-B and respectively border the transverse sides of base holder 6. Outer guide rails 10, 11 are connected at one end to a front frame element 14 of support holder 7. Outer guide rails 10, 11 are connected at their other end to a rear frame element 15 of support holder 7. Frame elements 14, 15 run transverse to longitudinal vehicle direction B-B and respectively border the transverse sides of support holder 7.

Switching devices 16 are between front frame element 12 of base holder 6 and front frame element 14 of support holder 7. Likewise, switching devices 16 are between rear frame element 13 of base holder 6 and rear frame element 15 of support holder 7.

Switching devices 16 between front frame elements 12, 14 activate when front frame elements 12, 14 meet one another which occurs when support holder 7 is in neutral position Rs relative to base holder 6. Switching devices 16 between rear frame elements 13, 15 activate when rear frame elements 13, 15 meet one another which occurs when support holder 7 is in operating position Bs relative to base holder 6. As such, switching devices 16 are operable for controlling electrically powered devices 17, 18 and 19, 20 of vehicle 1 as a function of the position of support holder 7. That is, switching devices 16 are operable for controlling devices 17, 18 and 19, 20 based on whether support holder 7 is at neutral position Rs, operating position Bs, or at a different position such as an intermediate position Zs between neutral position Rs and operating position Bs.

With reference to FIGS. 3 and 4 and with continual reference to FIGS. 1 and 2, each switching device 16 between front frame elements 12, 14 includes a switch 21 having a pair of switch components. In particular, the switch components of switch 21 are situated at mutually facing sides 26, 27 of front frame elements 12, 14. Similarly, each switching device 16 between rear frame elements 13, 15 includes a switch 22 having a pair of switch components. The switch components of switch 22 are also situated at mutually facing sides of rear frame elements 13, 15.

Each switch 21, 22 may be a Reed contact relay having a magnet and contact lugs joined to connecting wires. An electrical contact is established as soon as a magnetic field from the magnet is active via the connecting wires.

Switch 21 is active in the neutral position Rs of support holder 7 as front frame elements 12, 14 move adjacent to one another when support holder 7 is in the neutral position Rs causing the switch components of switch 21 on respective sides 26, 27 of front frame elements 12, 14 to contact one another. Similarly, switch 22 is active in the operating position Bs of support holder 7 as rear frame elements 13, 15 move adjacent to one another when support holder 7 is in the operating position Bs causing the switch components of switch 22 on respective sides of frame elements 13, 15 to contact one another.

Switch 21 activates when support holder 7 is in neutral position Rs to generate a signal to the operator of vehicle 1 that support holder 7 is in neutral position Rs (e.g., "Bicycle Carrier in Neutral Position"). Similarly, switch 22 activates when support holder 7 is in operating position Bs to generate a signal to the operator of vehicle 1 that support holder 7 is in operating position Bs (e.g., "Bicycle Carrier in Operating Position").

A pair of switching devices 16 are also operable together for actuating a warning device 23 when support holder 7 is in an intermediate position Zs between neutral position Rs and operating position Bs via a pair of switches 21, 22. For instance, a switching device 16 having switch 21 and a switching device 16 having switch 22 can function together to determine that support holder 7 is in intermediate position Zs when neither of switches 21, 22 are activated. Again, switch 21 activates when support holder 7 is in neutral position Rs and switch 22 activates when support holder 7 is in operating position Bs. Accordingly, if neither of switches 21, 22 activate, then it can be determined that support holder 7 is not in either of neutral Bs or operating Rs positions, but is instead in intermediate position Zs.

Likewise, a switching device 16 is also operable by itself to actuate warning device 23 when support holder is in an intermediate position Zs. For instance, a switching device 16 having switch 21 can determine that support holder 7 is in intermediate position Zs when switch 21 is not activated.

Warning device 23 is attached to an instrument panel in the passenger compartment of vehicle 1. Warning device 23 may also be accommodated at another location such as in the trunk of vehicle 1. Warning device 23 generates an acoustic or visual warning signal for an operator of vehicle 1 upon being actuated. The warning signal indicates to the operator that the support holder is in intermediate position Zs (e.g., "Bicycle Carrier in Intermediate Position").

Electrically powered devices 17, 18 may respectively be a speaker and a light generator. A switching device 16 associated with front frame elements 12, 14 may be connected to electrically powered devices 17, 18 to actuate such devices when support holder 7 is in neutral position Rs. Likewise, a switching device 16 associated with rear frame elements 13, 15 may be connected to electrically powered devices 17, 18 to actuate such devices when support holder 7 is in operating position Bs.

Similarly, electrical powered devices 19, 20 may include tail lights 24, 25 of bicycle carrier. A switching device 16 associated with front frame elements 12, 14 may be connected to electrically powered devices 19, 20 to actuate tail lights 24, 25 when support holder 7 is in neutral position Rs. Likewise, a switching device 16 associated with rear frame elements 13, 15 may be connected to electrically powered devices 19, 20 to actuate tail lights 24, 25 when support holder 7 is in operating position Bs.

In an embodiment, a switching device 16 associated with front frame elements 12, 14 is connected to electrically powered devices 17, 18 to actuate such devices when support holder is in neutral position Rs; and a switching device 16 associated with rear frame elements 13, 15 is connected to electrically powered devices 19, 20 to actuate such devices when support holder 7 is in operating position Bs. In another embodiment, a switching device 16 associated with front frame elements 12, 14 is connected to electrically powered devices 19, 20 to actuate such devices when support holder is in neutral position Rs; and a switching device 16 associated with rear frame elements 13, 15 is connected to electrically powered devices 17, 18 to actuate such devices when support holder 7 is in operating position Bs. Embodiments with other switching/electrically powered device arrangements are also possible.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A bicycle carrier for a vehicle, the carrier comprising:
a base holder mountable to a vehicle, wherein the base holder includes transversely extending spaced-apart front and rear frames;
a support holder for holding a bicycle, wherein the support holder includes transversely extending spaced-apart front and rear frames;
wherein the support holder is movable relative to the base holder between a neutral position and an operating position, wherein the front frames meet when the support holder is in the neutral position and the rear frames meet when the support holder is in the operating position;
first and second indicators and a warning device;
a first switch connected to the first indicator, the first switch having a pair of first switching components respectively located on the front frames, wherein the first switching components contact one another to activate the first switch when the front frames meet while the support holder is in the neutral position, wherein the first switch actuates the first indicator upon being activated;
a second switch connected to the second indicator, the second switch having a pair of second switching components respectively located on the rear frames, wherein the second switching components contact one another to activate the second switch when the rear frames meet while the support holder is in the operating position, wherein the second switch actuates the second indicator upon being activated; and
wherein the first and second switches are operable together to actuate the warning device when neither switch is activated while the support holder is not in either of the neutral position operating position.

2. The carrier of claim 1 wherein:
at least one of the first and second indicator devices includes a sound generator or a light generator.

3. The carrier of claim 1 wherein:
at least one of the first and second indicator devices includes a tail light.

4. A bicycle carrier for a vehicle, the carrier comprising:
a base holder mountable to a vehicle, wherein the base holder includes front and rear frame elements which are spaced apart from one another and extend transversely to a longitudinal vehicle direction;
a support holder for holding a bicycle, wherein the support holder includes front and rear frame elements which are spaced apart from one another and extend transversely to the longitudinal vehicle direction;
wherein the support holder is movable relative to the base holder in the longitudinal vehicle direction between a neutral position and an operating position, wherein the front frame elements meet when the support holder is in the neutral position, wherein the rear frame elements meet when the support holder is in the operating position;
a first switch having a pair of first switching components respectively located on the front frame elements, wherein the first switching components contact one another to activate the first switch when the front frame elements meet while the support holder is in the neutral position;
a second switch having a pair of second switching components respectively located on the rear frame elements, wherein the second switching components contact one another to activate the second switch when the rear frame elements meet while the support holder is in the operating position;
a first indicator device actuable to generate an indicator indicating that the support holder is in the neutral position, wherein the first switch actuates the first indicator device upon being activated while the support holder is in the neutral position;
a second indicator device actuable to generate an indicator indicating that the support holder is in the operating position, wherein the second switch actuates the second indicator device upon being activated while the support holder is in the operating position; and
a warning device actuable to generate a warning signal indicating that the support holder is in an intermediate position between the neutral position and the operating position, wherein the switches are operable together to actuate the warning device when neither switch is activated while the support holder is not in either of the neutral position or the operating position.

5. The carrier of claim 4 wherein:
one of the indicator devices includes a tail light connected to one of the base holder and the support holder.

6. The carrier of claim 4 wherein:
each pair of the switch components respectively form a Reed contact relay.

7. The carrier of claim 4 wherein:
the warning signal is an acoustic signal.

8. The carrier of claim 4 wherein:
the warning signal is a visual signal.

9. The carrier of claim 4 wherein:
the warning device is in a passenger compartment of the vehicle.

10. The carrier of claim 9 wherein:
the warning device is on an instrument panel in the passenger compartment of the vehicle.

11. A bicycle carrier for a vehicle, the carrier comprising:
a base holder mountable to a vehicle, wherein the base holder includes front and rear frame elements which are spaced apart from one another and extend transversely to a longitudinal vehicle direction;
a support holder for holding a bicycle, wherein the support holder includes front and rear frame elements which are spaced apart from one another and extend transversely to the longitudinal vehicle direction;
wherein the support holder is movable relative to the base holder in the longitudinal vehicle direction between a neutral position and an operating position, wherein the front frame elements meet when the support holder is in the neutral position, wherein the rear frame elements meet when the support holder is in the operating position;
a first switch having a pair of first switching components respectively located on the front frame elements, wherein the first switching components contact one another to activate the first switch when the front frame elements meet while the support holder is in the neutral position;
a first indicator device supported on at least one of the base holder and the support holder, the first indicator device connected to the first switch and actuable to generate an indicator indicating that the support holder is in the neutral position, wherein the first switch actuates the first indicator device upon being activated while the support holder is in the neutral position;
a second switch having a pair of second switching components respectively located on the rear frame elements, wherein the second switching components contact one another to activate the second switch when the rear frame elements meet while the support holder is in the operating position;
a second indicator device supported on at least one of the base holder and the support holder, the second indicator device connected to the second switch and actuable to generate an indicator indicating that the support holder is in the operating position, wherein the second switch actuates the second indicator device upon being activated while the support holder is in the operating position; and
a warning device actuable to generate a warning signal indicating that the support holder is in an intermediate position between the neutral position and the operating position, wherein the switches are operable together to actuate the warning device when neither switch is activated while the support holder is not in either of the neutral position or the operating position.

12. The carrier of claim 11 wherein:
at least one of the first and second indicator devices includes a sound generator.

13. The carrier of claim 11 wherein:
at least one of the first and second indicator devices includes a light generator.

14. The carrier of claim 11 wherein:
at least one of the first and second indicator devices includes a tail light.

15. The carrier of claim 11 wherein:
the second indicator device includes a pair of tail lights supported on the support holder.

16. The carrier of claim 11 wherein:
the switch components of the first switch form a first Reed contact relay, and the switch components of the second switch form a second Reed contact relay.

* * * * *

UNITED STATES PATENT AND TRADEMARK OFFICE
CERTIFICATE OF CORRECTION

| | | |
|---|---|---|
| PATENT NO. | : 7,857,180 B2 | Page 1 of 1 |
| APPLICATION NO. | : 11/773068 | |
| DATED | : December 28, 2010 | |
| INVENTOR(S) | : Harald Bergerhoff et al. | |

It is certified that error appears in the above-identified patent and that said Letters Patent is hereby corrected as shown below:

Column 6, Line 14, Claim 1:

After "neutral position" insert -- or the --.

Signed and Sealed this
Eighth Day of March, 2011

David J. Kappos
*Director of the United States Patent and Trademark Office*